US012113763B2

(12) United States Patent
Han

(10) Patent No.: US 12,113,763 B2
(45) Date of Patent: Oct. 8, 2024

(54) MESSAGE SENDING METHOD AND APPARATUS APPLIED TO AVIATION STOWAGE SYSTEM

(71) Applicant: TravelSky Technology Limited, Beijing (CN)

(72) Inventor: Yue Han, Beijing (CN)

(73) Assignee: TravelSky Technology Limited, Beijing (CN)

( * ) Notice: Subject to any disclaimer, the term of this patent is extended or adjusted under 35 U.S.C. 154(b) by 0 days.

(21) Appl. No.: 18/272,554

(22) PCT Filed: Jan. 10, 2022

(86) PCT No.: PCT/CN2022/070978
§ 371 (c)(1),
(2) Date: Jul. 14, 2023

(87) PCT Pub. No.: WO2022/152074
PCT Pub. Date: Jul. 21, 2022

(65) Prior Publication Data
US 2024/0073168 A1  Feb. 29, 2024

(30) Foreign Application Priority Data
Jan. 18, 2021  (CN) .......................... 202110063952.8

(51) Int. Cl.
*G06F 15/16*  (2006.01)
*H04L 51/21*  (2022.01)

(52) U.S. Cl.
CPC .................................. *H04L 51/21* (2022.05)

(58) Field of Classification Search
CPC ...................................................... H04L 51/21
(Continued)

(56) References Cited

U.S. PATENT DOCUMENTS 7,673,342 B2 *  3/2010  Hursey .............. G06Q 10/107
                                                        713/188
8,381,298 B2 *  2/2013  Blumfield ............ G06F 21/564
                                                        726/22
(Continued)

FOREIGN PATENT DOCUMENTS

CN          1187889 A      7/1998
CN        101494621 A      7/2009
(Continued)

OTHER PUBLICATIONS

International Search Report and Written Opinion for International Application No. PCT/CN2022/070978, mailed Mar. 28, 2022.
(Continued)

*Primary Examiner* — Alicia Baturay
(74) *Attorney, Agent, or Firm* — Wolf, Greenfield & Sacks, P.C.

(57) ABSTRACT

Disclosed are a message sending method and apparatus. The method includes: a front-end device receiving a message preview instruction and sending the message preview instruction to a server; the server determining, on the basis of the message preview instruction, whether a message currently corresponding to a message type satisfies a sending rule, and if so, making an electronic message correspond to the message type, and sending the electronic message to the front-end device; the front-end device outputting and displaying the electronic message for a user to view; and the user triggering a message sending instruction after confirming same, so as to complete the sending of the electronic message.

8 Claims, 4 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,819,823 | B1* | 8/2014 | Banerjee ............. | H04L 63/1441 |
| | | | | 719/311 |
| 8,903,931 | B1* | 12/2014 | Rothman ............... | G06F 40/106 |
| | | | | 705/14.35 |
| 9,076,147 | B2* | 7/2015 | Khoo .................... | H04L 51/216 |
| 9,223,980 | B1* | 12/2015 | Bao ..................... | H04L 63/1408 |
| 9,542,365 | B1* | 1/2017 | Rothman ................ | H04L 51/18 |
| 10,122,834 | B2* | 11/2018 | Qiu ........................ | H04L 67/01 |
| 10,861,032 | B2* | 12/2020 | Whitmore .......... | G06Q 30/0246 |
| 10,938,780 | B1* | 3/2021 | Gernhardt ........... | H04L 63/0245 |
| 11,122,014 | B2* | 9/2021 | Kaczyński ............ | H04L 9/0863 |
| 11,218,571 | B2* | 1/2022 | Xing ....................... | H04L 67/56 |
| 11,228,545 | B1* | 1/2022 | Chopra ................. | H04L 67/133 |
| 11,442,822 | B1* | 9/2022 | Chopra ................ | G06F 11/1451 |
| 11,736,438 | B2* | 8/2023 | Gernhardt ........... | H04L 63/0236 |
| 2014/0282085 | A1 | 9/2014 | Hsu et al. | |
| 2016/0345052 | A1 | 11/2016 | Wang et al. | |

FOREIGN PATENT DOCUMENTS

| | | |
|---|---|---|
| CN | 107634974 A | 1/2018 |
| CN | 112087317 A | 12/2020 |
| CN | 112769848 A | 5/2021 |
| JP | 2014-010515 A | 1/2014 |
| JP | 2020-149662 A | 9/2020 |

OTHER PUBLICATIONS

First Office Action for Japanese Application No. 2023-543118, mailed May 2, 2024.

* cited by examiner

| OPT | | PREVIEW | TYPE | ADDRESS | | | |
|---|---|---|---|---|---|---|---|
| ○ | ⊙HX ○IATA | 🔍 | LDM | | | | |
| ○ | ⊙HX ○IATA | 🔍 | UCM | | | | |
| ○ | ⊙HX ○IATA | 🔍 | LPM | | | | |
| ○ | ⊙HX ○IATA | 🔍 | EZFW | | | | |
| | ⊙HX ○IATA | 🔍 | OFF-LIR | | | | |
| ○ | | | CIP | | | | |
| ○ | ⊙HX ○IATA | 🔍 | SLS | | | | |

Figure 3

```
Document Preview                                                    ×

OFFLOADING INSTRUCTION/REPORT              CHECKED         EDNO
++++++++++++++++++++++++++++++
ALL WEIGHTS IN KG                                          02
FROM/TO FLIGHT    A-C/REG  D/V   VERSION  CREW  DATE   TIME
PEKSHA MU 3004L   B1655          320-232V  3/05  30MAR20 1850
OFFLOADING INSTRUCTION (ACTUAL WEIGHT IN KGS):
*************************************************************
                                           C&M WEIGHT: 00000
*************************************************************
                                           C&M WEIGHT: 00000
*************************************************************
                                           C&M WEIGHT: 00000
*************************************************************
:OFF
SH            SHA T/00800
RK:
                                           C&M WEIGHT: 00000
*************************************************************
SI.
                       PREPARED BY:  08996
THIS AIRCRAFT HAS BEEN OFFLOADED IN ACCORDANCE WITH THESE
INSTRUCTIONS
                       SIGNATURE:
~

PID/Address: [        ] [Send]
```

Figure 4

MESSAGE SENDING METHOD AND APPARATUS APPLIED TO AVIATION STOWAGE SYSTEM

This application is a national stage filing under 35 U.S.C. § 371 of International Patent Application Serial No. PCT/CN2022/070978, filed Jan. 10, 2022, which claims priority to Chinese Patent Application No. 202110063952.8, titled "MESSAGE SENDING METHOD AND APPARATUS", filed on Jan. 18, 2021 with the China National Intellectual Property Administration. The contents of these applications are incorporated herein by reference in their entireties.

FIELD

The present disclosure relates to technology of data processing, and in particular to a method and an apparatus for transmitting a message.

BACKGROUND

The generation and transmission of electronic messages are critical for civil aircraft stowage. Some critical electronic messages, such as installation lists (LDPP/LDPS) and manifests (LOADSHEET/ACARS), even may represent a final result of stowage. The stowage has a significant impact on aircraft flight safety, and thus the electronic messages representing the final result of the stowage are particularly important.

A stowage system includes many types of electronic messages. Each type of electronic messages is formed by at least dozens of pieces of data. Each piece of data may be queried on different pages. According to the conventional technology, the stowage staff may only remember in which page a piece of data may be queried, and then check data page by page to determine whether data in messages is correct. This process is complicated and time-consuming, and errors in electronic message data may be caused if changes in stowage data are not informed in time.

SUMMARY

In view of this, the following technical solutions are provided according to the present disclosure.

A method for transmitting a message, applied to a front-end device including a display screen, is provided. The method includes: receiving a message preview instruction, and transmitting the message preview instruction to a server, where the message preview instruction indicates a message type; receiving an electronic message generated by the server after determining that a current message corresponding to the message type meets a transmission rule; outputting and displaying the electronic message; and acquiring a message transmission instruction, and transmitting the message transmission instruction to the server, where the server transmits the electronic message.

In an embodiment, the method further includes: receiving error prompt information from the server after determining that the current message corresponding to the message type does not meet the transmission rule. The error prompt information indicates that it is incapable to perform preview and a reason for not performing preview.

In an embodiment, after outputting and displaying the electronic message, the method further includes: acquiring an exit preview instruction, and closing an output page of the electronic message.

A method for transmitting a message, applied to a server, is provided. The method includes: receiving a message preview instruction from a front-end device, where the message preview instruction indicates a message type; determining whether a current message corresponding to the message type meets a transmission rule; in a case that the current message corresponding to the message type meets the transmission rule, generating an electronic message corresponding to the message type, and transmitting the electronic message to the front-end device, where the front-end device outputs and displays the electronic message; and receiving a message transmission instruction from the front-end device, and transmitting the electronic message.

In an embodiment, the method further includes: in a case that the current message corresponding to the message type does not meet the transmission rule, generating error prompt information and transmitting the error prompt information to the front-end device, where the error prompt information indicates that it is incapable to perform preview and a reason for not performing preview.

In an embodiment, the method further includes: acquiring a message modification instruction; and modifying the electronic message based on the message modification instruction.

An apparatus for transmitting a message, applied to a front-end device including a display screen, is provided. The apparatus including: an instruction processing module, a message receiving module, a message display module, and an instruction transmitting module. The instruction processing module is configured to receive a message preview instruction and transmit the message preview instruction to a server, where the message preview instruction indicates a message type. The message receiving module is configured to receive an electronic message generated by the server after determining that a current message corresponding to the message type meets a transmission rule. The message display module is configured to output and display the electronic message. The instruction transmitting module is configured to acquire a message transmission instruction and transmit the message transmission instruction to the server, where the server transmits the electronic message.

In an embodiment, the apparatus further includes an information prompt module. The information prompt module is configured to receive error prompt information from the server after determining that the current message corresponding to the message type does not meet the transmission rule. The error prompt information indicates that it is incapable to perform preview and a reason for not performing preview.

An apparatus for transmitting a message, applied to a server, is provided. The apparatus includes: an instruction receiving module, a rule determining module, a message processing module, and a message transmitting module. The instruction receiving module is configured to receive a message preview instruction from a front-end device, where the message preview instruction indicates a message type. The rule determining module is configured to determine whether a current message corresponding to the message type meets a transmission rule. The message processing module is configured to, in a case that a determination result obtained by the rule determining module indicates that the current message corresponding to the message type meets the transmission rule, generate an electronic message corresponding to the message type and transmit the electronic message to the front-end device, where the front-end device outputs and displays the electronic message. The message transmitting module is configured to receive a message transmission instruction from the front-end device and transmit the electronic message.

A system for transmitting a message is provided. The system includes a front-end device and a server. The front-end device is configured to perform the method for transmitting a message applied to a front-end device described above. The server is configured to perform the method for transmitting a message applied to a server described above.

It can be seen from the above technical solutions that, compared with the conventional technology, a method and an apparatus for transmitting a message are provided according to the embodiments of the present disclosure. According to the present disclosure, a front-end device receives a message preview instruction and transmits the message preview instruction to a server. The server determines whether a current message corresponding to the message type meets a transmission rule based on the message preview instruction. In a case that the current message corresponding to the message type meets the transmission rule, the server generates an electronic message corresponding to the message type and transmits the electronic message to the front-end device. The front-end device outputs and displays the electronic message for the user to view. After determining that the electronic message is correct, the user triggers a message transmission instruction to transmit the electronic message. With the method and the apparatus for transmitting a message, the electronic message can be previewed on the display screen before being transmitted, facilitating the staff determining the correctness of the electronic message, thereby avoiding transmitting an electronic message with errors. The process is convenient and rapid, improving work efficiency of the staff and effectively reducing an error rate of the electronic message to be transmitted.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

FIG. 3 is a schematic diagram of a message operation page according to an embodiment of the present disclosure;

FIG. 4 is a schematic diagram of a message preview page according to an embodiment of the present disclosure;

DETAILED DESCRIPTION

Figure 1:
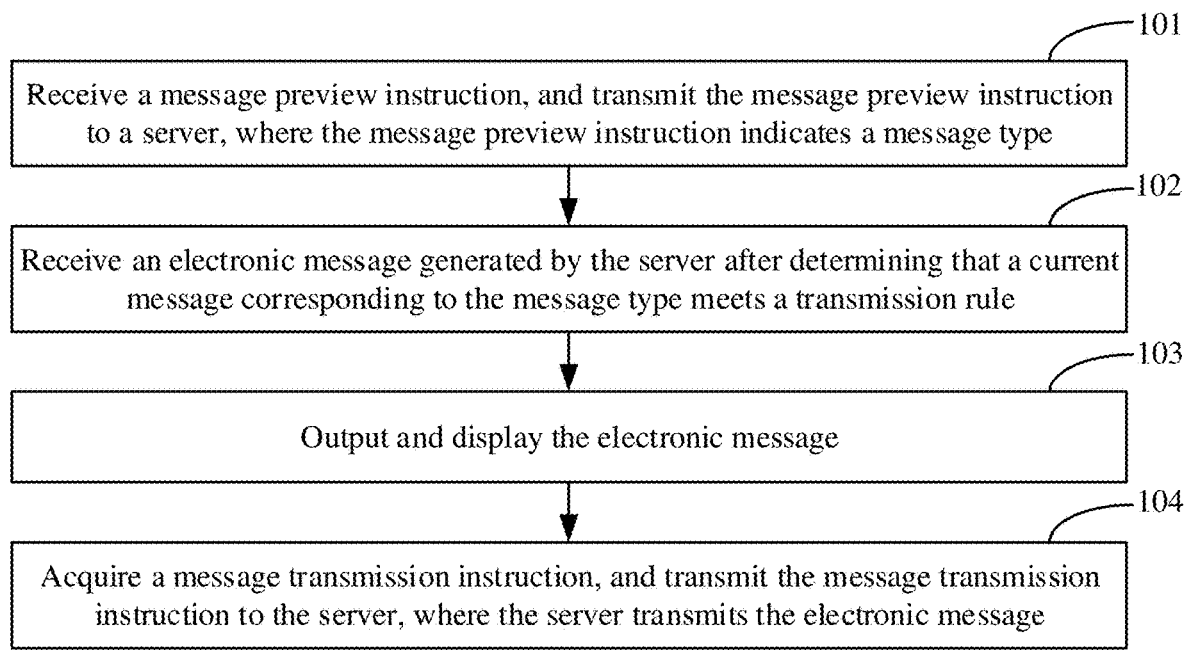
FIG. 1 is a flow chart of a method for transmitting a message according to an embodiment of the present disclosure.

Hereinafter, the embodiments of the present disclosure are described in detail with reference to the drawings. Although some embodiments of the present disclosure are shown in the drawings, it should be understood that the present disclosure may be implemented in various forms and should not be construed as limited to the embodiments set forth herein. The embodiments are provided for thoroughly and completely understanding the present disclosure. It should be understood that the drawings and the embodiments in the present disclosure are only schematic, and are not intended to limit the protection scope of the present disclosure.

The term "including" and variations thereof in the present disclosure means open-ended inclusion, that is, "including but not limited to". The term "based on" means "at least partially based on". The term "one embodiment" means "at least one embodiment". The term "another embodiment" means "at least one another embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not intended to limit an order or interdependence of functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

FIG. 1 is a flow chart of a method for transmitting a message according to an embodiment of the present disclosure. The method for transmitting a message shown in FIG. 1 is applied to a front-end device including a display screen. As shown in FIG. 1, the method for transmitting a message may include the following steps 101 to 104.

In step 101, a message preview instruction is received, and the message preview instruction is transmitted to a server. The message preview instruction indicates a message type.

In the front-end device, a "preview" button may be configured in a message operation page. When the user clicks the button, it indicates that an electronic message is required to be generated. After receiving a message preview instruction triggered by the user, it is required for the front-end device to transmit the message preview instruction to a back-end server for performing recognition processing.

In the stowage work for the aircraft, there are many types of electronic messages. Different types of electronic messages may include different data contents and message formats. Therefore, in generating a message, it is required to determine which type of message the user wants to generate. Thus, it is required for the message preview instruction to indicate a message type. In a specific implementation, each type of message corresponds to a "preview" button in the message operation page. After the user triggers a "preview" button, it indicates that the type of the message that the user wants to generate is the message type corresponding to the triggered "preview" button.

In step 102, an electronic message, generated by the server after determining that a current message corresponding to the message type meets a transmission rule, is received.

After the message preview instruction is received, it is required for the server to determine whether a condition for generating a message is met. That is, the server generates an electronic message after the server determines that the current message corresponding to the message type meets the transmission rule. An electronic message is generated only in a case that the condition for generating a message is met.

In step 103, the electronic message is outputted and displayed.

After receiving the electronic message generated by the server, the front-end device may automatically display the electronic message in a preview interface. The user may see the content of the entire electronic message in the preview interface, so as the user may check whether there is an error in the electronic message at one time. Compared with the conventional technology in which it is required for the staff to check data in the message in different pages, the efficiency of checking message can be greatly improved according to the present disclosure.

In step 104, a message transmission instruction is acquired, and the message transmission instruction is transmitted to the server. The server transmits the electronic message.

A "message transmission" button may be configured in the message preview interface. In a case that the user determines that there is no error in the data of the message, the user may directly trigger a message transmission instruction to control the server to transmit the electronic message.

With the method for transmitting a message according to the embodiments, the electronic message, before being transmitted, can be previewed on the display screen, facilitating the staff determining the correctness of the electronic message, thereby avoiding transmitting an electronic message with errors. The process is convenient and rapid, improving work efficiency of the staff and effectively reducing an error rate of the electronic message to be transmitted.

In other embodiments, in addition to the steps disclosed in the above embodiments, the method for transmitting a message may further include: receiving error prompt information from the server after determining that the current message corresponding to the message type does not meet the transmission rule. The error prompt information indicates that it is incapable to perform preview and a reason for not performing preview.

For example, in a case that the condition for generating a message is not met or in a case that a data format in the message is incorrect, the message cannot be generated. Therefore, it is required to notify the user. Thus, the server generates error prompt information and transmits the error prompt information to the front-end device, so that the front-end device displays the error prompt information on the display screen for prompting the user.

In another embodiment, after outputting and displaying the electronic message, the method for transmitting a message may further include: acquiring an exit preview instruction and closing an output page of the electronic message.

For example, in a case that the user determines that there is an error in a displayed electronic message, an exit preview instruction is required, and then the user may modify the data in the electronic message. Alternatively, before a predetermined time instant at which the electronic message is transmitted, the user may actively exit the message preview after previewing the electronic message.

Figure 2:
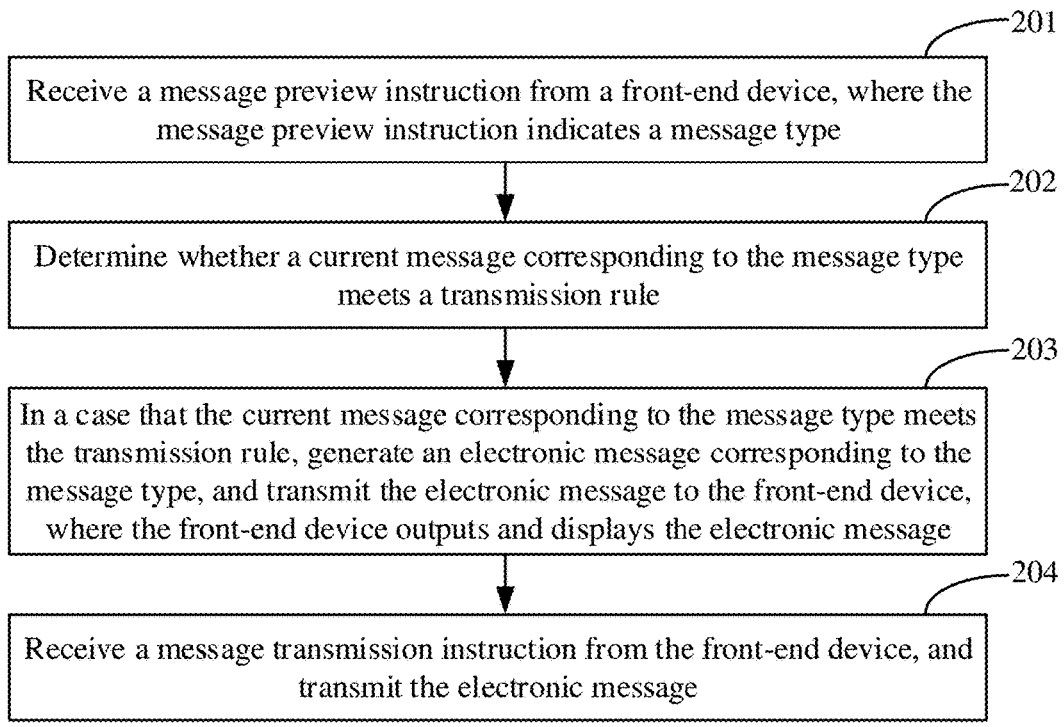
FIG. 2 is a flow chart of a method for transmitting a message according to another embodiment of the present disclosure.

FIG. 2 is a flow chart of a method for transmitting a message according to another embodiment of the present disclosure. The method for transmitting a message shown in FIG. 2 is applied to a server. As shown in FIG. 2, the method for transmitting a message may include the following steps 201 to 204.

In step 201, a message preview instruction is received from a front-end device. The message preview instruction indicates a message type.

In practices, it is required for the front-end device and the server to cooperate with each other to check and transmit a message together through information interaction. In an implementation, the user performs data interaction with the server through the front-end device. The user may click a "preview" button on the display screen of the front-end device to trigger the generation of the message preview instruction. Then, the server receives the message preview instruction from the front-end device, and performs subsequent operations based on the message preview instruction.

In step 202, it is determined whether a current message corresponding to the message type meets a transmission rule.

The server firstly determines whether a condition for creating a message is met. Only in a case that the condition for creating a message is met, operations of generating a message are performed.

In step 203, in a case that the current message corresponding to the message type meets the transmission rule, an electronic message corresponding to the message type is generated, and the electronic message is transmitted to the front-end device. The front-end device outputs and displays the electronic message.

Data included in an electronic message and an encoding manner of the electronic message may be preset in a system, so that an electronic message may be automatically generated based on preset configuration information when it is required to generate an electronic message. The process of generating an electronic message may be the same as the process of generating an electronic message according to the conventional technology, which is not limited in the present disclosure.

In step 204, a message transmission instruction is received from the front-end device, and the electronic message is transmitted.

After the electronic message is generated, it is required to transmit the electronic message to the front-end device for outputting and displaying the electronic message, that is, for previewing the electronic message. The user may view the entire electronic message on the display screen of the front-end device to check the content of the electronic message without checking the data in the message in different pages, facilitating the user checking.

With the method for transmitting a message according to the embodiments, the electronic message, before being transmitted, can be previewed on the display screen, facilitating the staff determining the correctness of the electronic message, thereby avoiding transmitting an electronic message with errors. The process is convenient and rapid, improving work efficiency of the staff and effectively reducing an error rate of the electronic message to be transmitted.

In another embodiment, the method for transmitting a message may further include: in a case that the current message corresponding to the message type does not meet the transmission rule, generating error prompt information and transmitting the error prompt information to the front-end device. The error prompt information indicates that it is incapable to perform preview and a reason for not performing preview.

In another embodiment, the method for transmitting a message may further include: acquiring a message modification instruction; and modifying the electronic message based on the message modification instruction.

In a case that the user determines that there is an error in the electronic message in the message preview page, it is required to modify the message data to ensure the accuracy of the electronic message and the smooth execution of subsequent operations.

In a specific implementation, the process of performing the method for transmitting a message may include: clicking to preview, determining whether a transmission rule is met, generating a message, displaying the message, checking whether the message is correct, clicking to transmit the message, and transmitting the message.

The clicking to preview is performed for providing an entry for the process. The verifying whether the transmission rule is met is a premise for transmitting an electronic message. The generating a message is a core function, providing a condition for subsequent processes. The displaying a message is performed for previewing the electronic message, that is, the generated message is not transmitted directly and is displayed in an interactive page, providing a basis for subsequently determining whether the message is correct. The checking whether the message is correct is performed based on the above operations. The clicking to transmit the message is performed after it is determined that the message is correct. Then, the transmitting the message is performed. There is no other operation between the transmitting the message and the clicking to transmit the message, ensuring that no operation is performed on the to-be-transmitted message after it is determined that the message is correct, avoiding an error in the data of the message caused by changes in the data in the message.

In an implementation scenario of a stowage system in the aviation field, it is required for a front-end program (the front-end device) of the stowage system and a back-end program (the server) of the stowage system to cooperate to transmit a message. Firstly, it is required to arrange a preview button at a front end, and a clicking signal is transmitted to a back end after the preview button is clicked. The back end determines whether a condition for creating a message is met. In a case that the condition for creating a message is met, a message is generated, and the generated message is transmitted to the front end. After receiving the generated message, it is required for the front end to display the entire message to the user in a preview page. Then, the user may view the entire electronic message and determine whether the message is correct, and then the user may determine whether to transmit the message or to modify the message based on a determination result. In a case of transmitting the message, the user may click a transmitting button in the preview page at the front end, and then the front end transmits a clicking signal to the back end. Finally, the back end transmits the message.

The front end of the stowage system is the front-end program of the stowage system. Codes are stored at a front-end server, and are executed for displaying a page of the stowage system and performing determination based on an input in the page. The back end of the stowage system is the back end program of the stowage system. Codes are stored at a back-end server, and are executed for realizing a calculation module at the back end of the stowage system, and generating and transmitting an electronic message.

Figure 5:
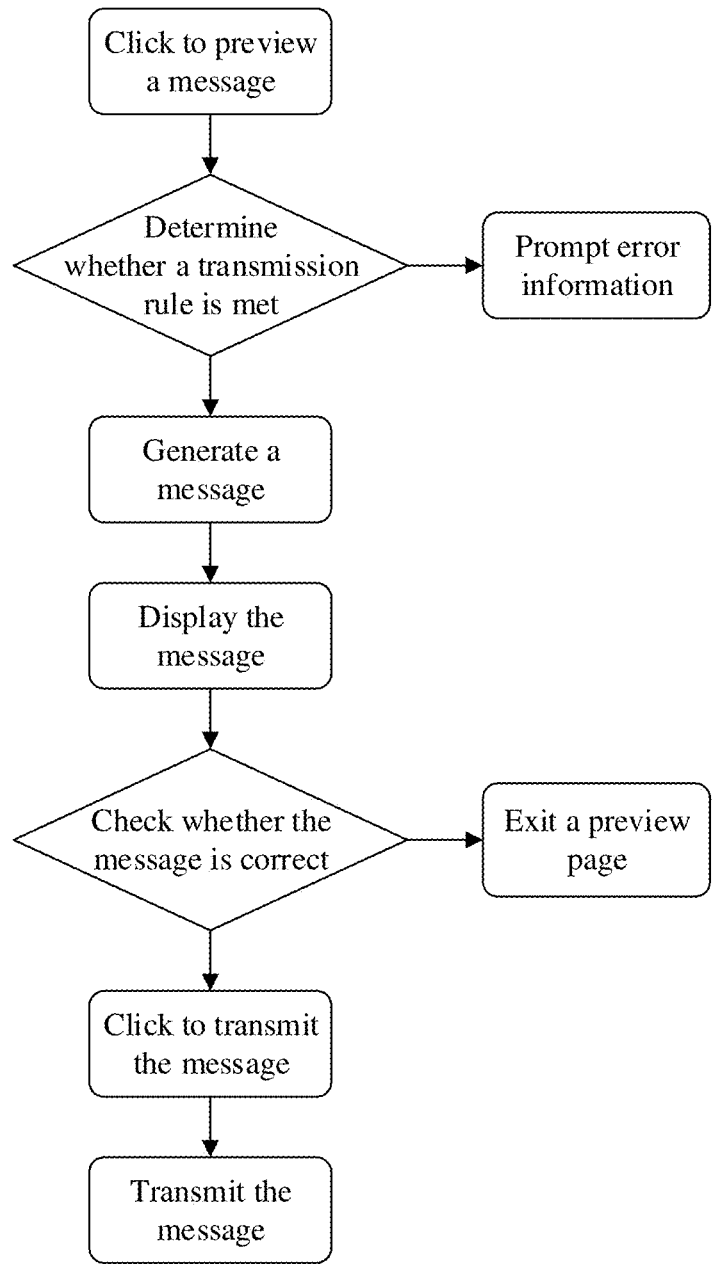
FIG. 5 is a schematic diagram showing a process of transmitting a message according to an embodiment of the present disclosure.

FIG. 3 is a schematic diagram of a message operation page according to an embodiment of the present disclosure, in which PREVIEW represents a preview button. FIG. 4 is a schematic diagram of a message preview page according to an embodiment of the present disclosure. FIG. 5 is a schematic diagram of a process of transmitting a message according to an embodiment of the present disclosure. The contents described in the above embodiments may be understood in conjunction with FIGS. 3, 4 and 5.

In some embodiments, a front-end device and a server may communicate based on any currently known or future developed network protocol such as a hypertext transfer protocol (HTTP), and may be connected to each other via a digital data communication (for example, communication network) in any form or with any medium. The communication network includes, for example, a local area network (LAN), a wide area network (WAN), an Internet network (for example, the Internet), an end-to-end network (for example, an ad hoc end-to-end network), and any currently known or future developed network.

Although the above operations are described in a specific order in the embodiments, it should not be construed as that these operations are required to be performed in the specific order shown or performed in a sequential order. In some conditions, multitasking and parallel processing may be advantageous.

It should be understood that the steps in embodiments of the method of the present disclosure may be performed in different orders and/or in parallel. In addition, the embodiments of the method may include additional steps and/or omit to perform the illustrated steps, not limiting the scope of the present disclosure.

The computer program codes for performing the operations in the present disclosure may be written in one or more programming languages or combinations thereof. The programming languages include, but are not limited to, an object-oriented programming language, such as Java, Smalltalk, and C++, and a conventional procedural programming language, such as C language or a similar programming language. The program codes may be entirely executed on a user computer, partially on the user computer, as a stand-alone software package, partially on the user computer and partially on a remote computer, or entirely on the remote computer or a server. In the case of involving a remote computer, the remote computer may be connected to a user computer or an external computer through any kind of network including the local area network (LAN) or the wide area network (WAN) (for example, the remote computer may be connected to the user computer or the external computer through Internet connection by an Internet service provider).

Figure 6:
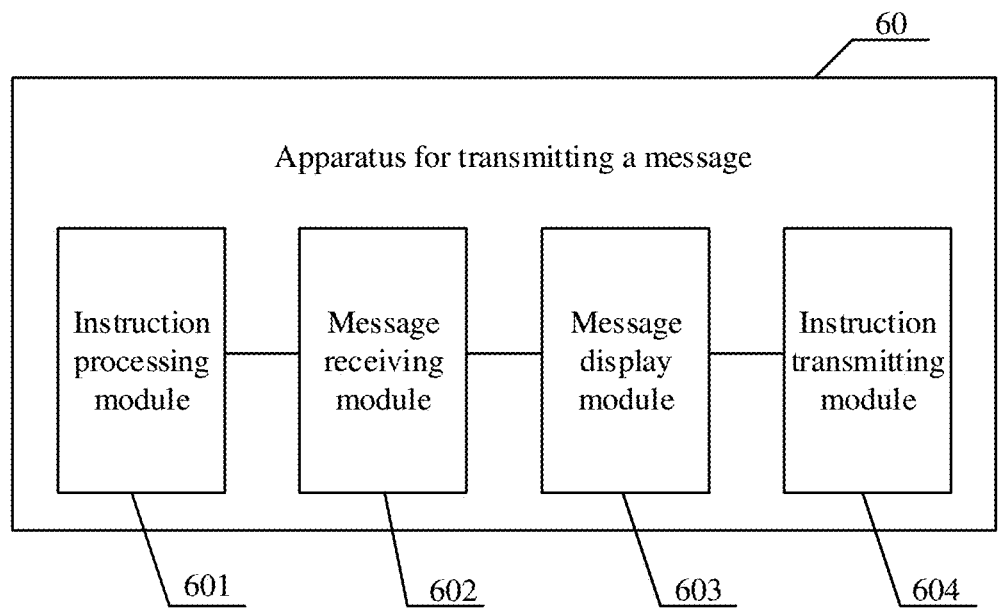
FIG. 6 is a schematic structural diagram of an apparatus for transmitting a message according to an embodiment of the present disclosure.

FIG. 6 is a schematic structural diagram of an apparatus for transmitting a message according to an embodiment of the present disclosure. The apparatus shown in FIG. 6 is applied to a front-end device including a display screen. As shown in FIG. 6, the apparatus 60 for transmitting a message may include an instruction processing module 601, a message receiving module 602, a message display module 603 and an instruction transmitting module 604.

The instruction processing module 601 is configured to receive a message preview instruction, and transmit the message preview instruction to a server. The message preview instruction indicates a message type.

The message receiving module 602 is configured to receive an electronic message generated by the server after determining that a current message corresponding to the message type meets a transmission rule.

The message display module 603 is configured to output and display the electronic message.

The instruction transmitting module 604 is configured to acquire a message transmission instruction and transmit the message transmission instruction to the server. The server transmits the electronic message.

In other embodiment, the apparatus for transmitting a message may further include an information prompt module. The information prompt module is configured to receive error prompt information from the server after determining that the current message corresponding to the message type does not meet the transmission rule. The error prompt information indicates that it is incapable to perform preview and a reason for not performing preview.

Figure 7:
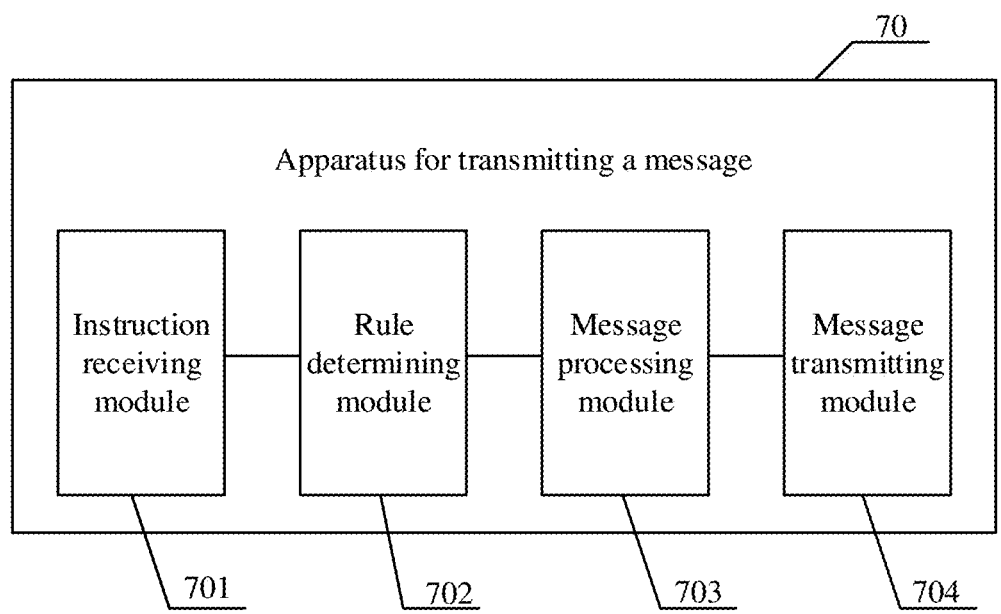
FIG. 7 is a schematic structural diagram of an apparatus for transmitting a message according to another embodiment of the present disclosure.

FIG. 7 is a schematic structural diagram of an apparatus for transmitting a message according to another embodiment of the present disclosure. The apparatus shown in FIG. 7 is applied to a server. As shown in FIG. 7, the apparatus 70 for transmitting a message may include an instruction receiving module 701, a rule determining module 702, a message processing module 703 and a message transmitting module 704.

The instruction receiving module 701 is configured to receive a message preview instruction from a front-end device. The message preview instruction indicates a message type.

The rule determining module 702 is configured to determine whether a current message corresponding to the message type meets a transmission rule.

The message processing module 703 is configured to, in a case that a determination result obtained by the rule determining module indicates that the current message corresponding to the message type meets the transmission rule, generate an electronic message corresponding to the message type and transmit the electronic message to the front-end device. The front-end device outputs and displays the electronic message.

The message transmitting module 704 is configured to receive a message transmission instruction from the front-end device and transmit the electronic message.

With the apparatus for transmitting a message according to the embodiments, the electronic message, before being transmitted, can be previewed on the display screen, facilitating the staff determining the correctness of the electronic message, thereby avoiding transmitting an electronic message with errors. The process is convenient and rapid, improving work efficiency of the staff and effectively reducing an error rate of the electronic message to be transmitted.

Furthermore, a system for transmitting a message is provided according to the present disclosure. The system includes a front-end device and a server. The front-end device is configured to perform the method for transmitting a message applied to the front-end device according to any one of the embodiments described above. The server is configured to perform the method for transmitting a message applied to the server according to any one of the embodiments described above.

For specific implementations of the apparatus for transmitting a message and the system for transmitting a message, one may refer to the corresponding contents in the method embodiments, which are not repeated herein.

The functions described above herein may be performed at least partially by one or more hardware logic units. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and the like.

Although the subject of the present disclosure is described according to the structural features and/or logical actions of the method, it should be understood that the subject defined in the claims is not necessarily limited to the specific features or actions described above. Instead, the specific features and operations illustrated above are merely examples of implementing the claims.

Although multiple implementation details are included in the above descriptions, the details should not be interpreted as limitations to the scope of the present disclosure. Some features described in a context of an embodiment may be implemented in combination in another embodiment. Alternatively, some features described in a context of an embodiment may be implemented in multiple embodiments separately or in any suitable sub-combination.

The above description merely includes preferred embodiments of the present disclosure and explanations of the technical principles used. Those skilled in the art should understand that the scope of the present disclosure is not limited to the technical solution formed by a combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

The invention claimed is:

1. A method for transmitting a message, applied to a front-end device comprising a display screen, comprising:
   receiving a message preview instruction, and transmitting the message preview instruction to a server, wherein the message preview instruction indicates a message type;
   receiving an electronic message generated by the server after determining that a current message corresponding to the message type meets a transmission rule;
   outputting and displaying the electronic message;
   acquiring a message transmission instruction, and transmitting the message transmission instruction to the server, wherein the server transmits the electronic message; and
   receiving error prompt information from the server after determining that the current message corresponding to the message type does not meet the transmission rule, wherein the error prompt information indicates that it is incapable to perform preview and a reason for not performing preview.

2. The method for transmitting a message according to claim 1, wherein after outputting and displaying the electronic message, the method further comprises: acquiring an exit preview instruction, and closing an output page of the electronic message.

3. An apparatus for transmitting a message, applied to a front-end device comprising a display screen, comprising:
   a processor; and
   a memory storing computer instructions that are executed by the processor;
   wherein the processor is configured, when executing the computer instructions, to perform the method according to claim 1.

4. The apparatus for transmitting a message according to claim 3, wherein the processor is further configured to
   receive error prompt information from the server after determining that the current message corresponding to the message type does not meet the transmission rule, wherein the error prompt information indicates that it is incapable to perform preview and a reason for not performing preview.

5. A method for transmitting a message, applied to a server, comprising:
- receiving a message preview instruction from a front-end device, wherein the message preview instruction indicates a message type;
- determining whether a current message corresponding to the message type meets a transmission rule;
- in a case that the current message corresponding to the message type meets the transmission rule, generating an electronic message corresponding to the message type, and transmitting the electronic message to the front-end device, wherein the front-end device outputs and displays the electronic message;
- receiving a message transmission instruction from the front-end device, and transmitting the electronic message; and
- in a case that the current message corresponding to the message type does not meet the transmission rule, generating error prompt information and transmitting the error prompt information to the front-end device, wherein the error prompt information indicates that it is incapable to perform preview and a reason for not performing preview.

6. The method for transmitting a message according to claim 5, further comprising: acquiring a message modification instruction; and modifying the electronic message based on the message modification instruction.

7. An apparatus for transmitting a message, applied to a server, comprising:
- a processor; and
- a memory storing computer instructions that are executed by the processor;
- wherein the processor is configured, when executing the computer instructions, to perform the method according to claim 5.

8. A system for transmitting a message, comprising:
- a front-end device, configured to:
- receive a message preview instruction, and transmit the message preview instruction to a server, wherein the message preview instruction indicates a message type;
- receive an electronic message generated by the server after determining that a current message corresponding to the message type meets a transmission rule;
- output and display the electronic message;
- acquire a message transmission instruction, and transmit the message transmission instruction to the server, wherein the server transmits the electronic message; and
- receive error prompt information from the server after determining that the current message corresponding to the message type does not meet the transmission rule, wherein the error prompt information indicates that it is incapable to perform preview and a reason for not performing preview; and
- a server, configured to:
- receive a message preview instruction from a front-end device, wherein the message preview instruction indicates a message type;
- determine whether a current message corresponding to the message type meets a transmission rule;
- in a case that the current message corresponding to the message type meets the transmission rule, generate an electronic message corresponding to the message type, and transmit the electronic message to the front-end device, wherein the front-end device outputs and displays the electronic message;
- receive a message transmission instruction from the front-end device, and transmit the electronic message; and
- in a case that the current message corresponding to the message type does not meet the transmission rule, generate error prompt information and transmitting the error prompt information to the front-end device, wherein the error prompt information indicates that it is incapable to perform preview and a reason for not performing preview.

* * * * *